United States Patent
Ishikawa et al.

(10) Patent No.: US 9,876,897 B2
(45) Date of Patent: *Jan. 23, 2018

(54) COMMUNICATION APPARATUS, COMMUNICATION CONTROL METHOD, AND NON-TRANSITORY COMPUTER-READABLE RECORDING MEDIUM

(71) Applicant: KYOCERA Corporation, Kyoto (JP)

(72) Inventors: Shuji Ishikawa, Yokohama (JP); Yasuhiro Ito, Tokyo (JP); Tomoya Kamijo, Yokohama (JP); Hidetaka Hayashi, Yokohama (JP); Kohei Michigami, Yokohama (JP); Kazuo Onishi, Yokohama (JP); Kazuya Chito, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/422,737

(22) Filed: Feb. 2, 2017

(65) Prior Publication Data

US 2017/0223173 A1    Aug. 3, 2017

(30) Foreign Application Priority Data

Feb. 3, 2016 (JP) ................. 2016-019114

(51) Int. Cl.
*H04W 24/08* (2009.01)
*H04M 1/725* (2006.01)
(Continued)

(52) U.S. Cl.
CPC ......... *H04M 1/72577* (2013.01); *H04W 4/18* (2013.01); *H04W 4/20* (2013.01); *H04W 24/08* (2013.01)

(58) Field of Classification Search
CPC ...... G06F 21/6227; G06F 21/31; G06F 21/44; G06F 2221/2117; G06F 8/65;
(Continued)

(56) References Cited

U.S. PATENT DOCUMENTS

2006/0212561 A1* 9/2006 Feng ................... H04L 63/0227
                                                709/223
2015/0181403 A1   6/2015 Tanaka et al.
2016/0288905 A1* 10/2016 Gong .................. H04L 63/101

FOREIGN PATENT DOCUMENTS

| CN | 103905260 A | 7/2014 |
| JP | 2014-022986 A | 2/2014 |
| JP | 2015-162701 A | 9/2015 |

OTHER PUBLICATIONS

An Office Action; "Notice of Reasons for Rejection," issued by the Japanese Patent Office dated Jul. 12, 2016, which corresponds to Japanese Patent Application No. 2016-019114; and is related to the present application; with English language Concise Explanation.
(Continued)

*Primary Examiner* — Diane Mizrahi
(74) *Attorney, Agent, or Firm* — Studebaker & Brackett PC

(57) ABSTRACT

A communication apparatus includes a controller that prohibits data communication by default, receives a request for data communication from an application, permits data communication of the application in accordance with a UID of the application issuing the request, and prohibits data communication of the application depending on an ID of a group to which the application issuing the request belongs.

6 Claims, 9 Drawing Sheets

(51) Int. Cl.
*H04W 4/20* (2009.01)
*H04W 4/18* (2009.01)

(58) Field of Classification Search
CPC ....... G06F 2221/2107; B64C 2201/143; B64C 2201/146; B64C 39/024; H04W 24/08; H04W 12/06; H04W 84/08; H04W 12/08; H04W 36/0027; H04W 36/14; H04W 36/28; H04W 48/12; H04W 4/08; H04W 4/22; H04W 76/007; H04W 84/12
See application file for complete search history.

(56) References Cited

OTHER PUBLICATIONS

An Office Action; "Final Reason for Rejection," issued by the Japanese Patent Office dated Oct. 11, 2016, which corresponds to Japanese Patent Application No. 2016-019114; and is related to the present application; with English language Concise Explanation.
An Office Action; "Notice of Reasons for Rejection," issued by the Japanese Patent Office dated Jan. 24, 2017, which corresponds to Japanese Patent Application No. 2016-238470; and is related to the present application; with English language Concise Explanation.
Elenkov; Android Security Internals: an In-Depth Guide to Android's Security Architecture; No Starch Press, Inc.; 2014.

* cited by examiner

COMMUNICATION APPARATUS, COMMUNICATION CONTROL METHOD, AND NON-TRANSITORY COMPUTER-READABLE RECORDING MEDIUM

CROSS-REFERENCE TO RELATED APPLICATIONS

This application claims priority to and the benefit of Japanese Patent Application No. 2016-019114 filed on Feb. 3, 2016, the entire contents of which are incorporated herein by reference.

TECHNICAL FIELD

This disclosure relates to a communication apparatus, a communication control method, and a non-transitory computer-readable recording medium.

BACKGROUND

Communication apparatuses such as mobile terminals that can perform data communication have been proposed. Many communication apparatuses are configured so that while data communication by applications running on the communication apparatus is permitted by default, data communication by applications selected by the user can be prohibited.

The communication apparatus permits or prohibits data communication by filtering. The communication apparatus also counts the amount of data communication for management. The data that are counted are data for which data communication is permitted during the filtering. In this case, depending on the method for counting the amount of communication data, the counted amount of communication data and the amount of data actually transmitted to the network might differ.

SUMMARY

A communication apparatus according to one of the embodiments of this disclosure includes:
a controller configured to:
prohibit data communication by default;
receive a request for data communication from an application;
permit data communication of the application in accordance with a UID of the application issuing the request; and
prohibit data communication of the application depending on an ID of a group to which the application issuing the request belongs.

A communication control method according to one of the embodiments of this disclosure includes:
on a communication apparatus,
prohibiting data communication by default;
receiving a request for data communication from an application; and
permitting data communication of the application in accordance with a UID of the application issuing the request, and prohibiting data communication of the application depending on an ID of a group to which the application issuing the request belongs.

A non-transitory computer-readable recording medium according to one of the embodiments of this disclosure includes computer program instructions, which when executed by a computer functioning as a communication apparatus, cause the computer to:
prohibit data communication by default;
receive a request for data communication from an application; and
permit data communication of the application in accordance with a UID of the application issuing the request, and prohibit data communication of the application depending on an ID of a group to which the application issuing the request belongs.

A communication apparatus according to one of the embodiments of this disclosure includes:
a controller configured to:
prohibit data communication by default;
receive a request for data communication from an application;
count an amount of data communication of the application in accordance with a UID of the application issuing the request; and
not count an amount of data communication of the application depending on an ID of a group to which the application issuing the request belongs.

A communication control method according to one of the embodiments of this disclosure includes:
on a communication apparatus,
prohibiting data communication by default;
receiving a request for data communication from an application; and
counting an amount of data communication of the application in accordance with a UID of the application issuing the request, and not counting an amount of data communication of the application depending on an ID of a group to which the application issuing the request belongs.

A non-transitory computer-readable recording medium according to one of the embodiments of this disclosure includes computer program instructions, which when executed by a computer functioning as a communication apparatus, cause the computer to:
prohibit data communication by default;
receive a request for data communication from an application; and
count an amount of data communication of the application in accordance with a UID of the application issuing the request, and not count an amount of data communication of the application depending on an ID of a group to which the application issuing the request belongs.

DETAILED DESCRIPTION

Embodiment 1

The following describes a communication apparatus according to one of the embodiments in detail with reference to the drawings. The communication apparatus according to this embodiment may be a mobile device, such as a mobile phone or a smartphone. The communication apparatus according to this embodiment, however, is not limited to being a mobile device and may be any of a variety of electronic devices that perform data communication, such as a desktop PC (Personal Computer), a notebook PC, a tablet PC, a household appliance, an industrial device (FA (Factory Automation) device), a dedicated terminal, or the like.

[Apparatus Structure]

Figure 1:
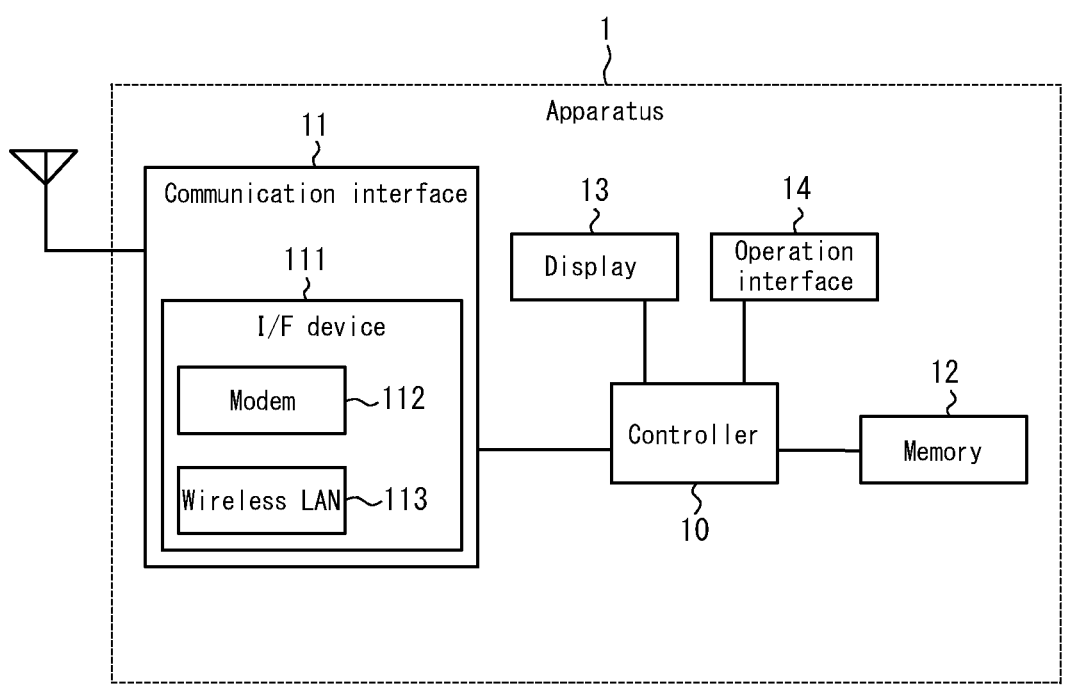
FIG. 1 is a functional block diagram schematically illustrating an example of the structure of a communication apparatus according to Embodiment 1.

FIG. 1 is a functional block diagram schematically illustrating an example of the structure of a communication apparatus 1 according to this embodiment. As illustrated in FIG. 1, the communication apparatus 1 includes a controller 10, a communication interface 11, a memory 12, a display 13, and an operation interface 14. The controller 10 is connected to and controls the communication interface 11, memory 12, display 13, and operation interface 14.

The controller 10 may be configured by a processor, microcomputer, or the like that can execute an operating system (OS) and application software (application). The OS may, for example, be Android® (Android is a registered trademark in Japan, other countries, or both). The application is described below.

The communication interface 11 is a communication interface that performs cellular communication, wireless LAN (Local Area Network) communication, or the like and is provided with an interface (I/F) device 111. The I/F device 111 includes a modem 112 and a wireless LAN device 113. The communication interface 11 is connected to a network such as the Internet using the I/F device 111 and performs data communication with the network. As a result, the communication apparatus 1 can perform data communication with the network. The communication interface 11 is connected to the controller 10 and acquires data to be output to the network from the controller 10. The controller 10 selects data to output to the communication interface 11 based on filtering. The filtering is described below. The controller 10 also acquires data received from the network from the communication interface 11.

When connecting to the network with a cellular communication method, a pay-as-you-go fee structure is typically adopted, with the communication fee increasing as the amount of transmitted data (packets) increases. On the other hand, when connecting to the network with a method such as wireless LAN communication, such a fee structure is not typical.

The memory 12 may, for example, be configured by a semiconductor memory. A variety of information or data, along with programs for applications, the OS, and the like executed by the controller 10, are stored in the memory 12. The controller 10 acquires and executes programs stored in the memory 12. The controller 10 stores data generated by executing the programs in the memory 12. The memory 12 may also function as a working memory.

The display 13 displays characters, images, objects for operation, pointers, and the like based on information acquired from the controller 10. The display 13 may, for example, be a display device such as a liquid crystal display, an organic EL (Electroluminescence) display, an inorganic EL display, or the like, but is not limited to these examples.

The operation interface 14 may be configured by physical keys such as numeric keys, a touchpad, a touch panel, or the like. In accordance with the content of input acquired from the operation interface 14, the controller 10 performs actions such as moving the pointer or the like displayed on the display 13 and selecting an object for operation.

Figure 2:
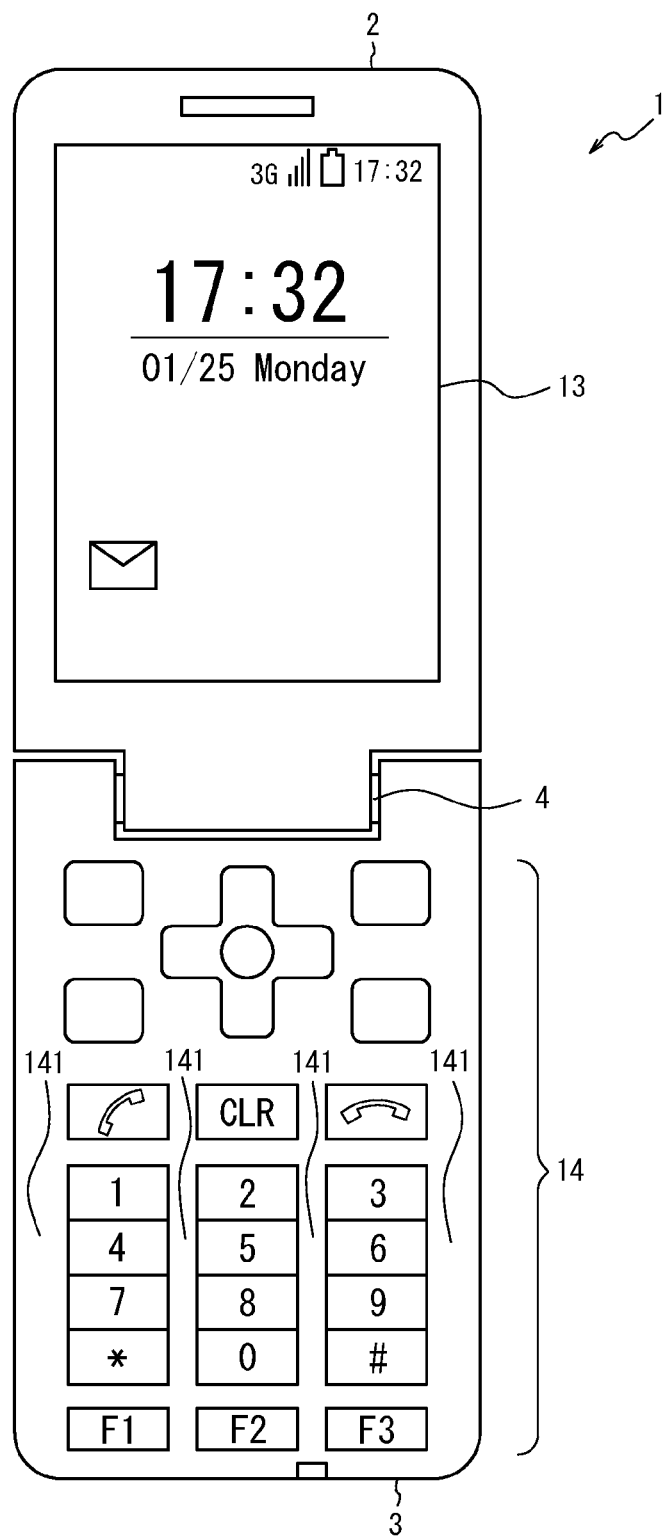
FIG. 2 is an external view of an example of the communication apparatus according to Embodiment 1.

FIG. 2 is an external view of an example of the communication apparatus 1 according to this embodiment. As illustrated in FIG. 2, the communication apparatus 1 according to this embodiment is a folding feature phone (flip phone, clamshell phone, or the like). In the communication apparatus 1, an upper housing 2 and a lower housing 3 are connected by a hinge 4 so as to be rotatable. The upper housing 2 is provided with the display 13, and the lower housing 3 is provided with the operation interface 14. The operation interface 14 is provided with physical keys, such as numeric keys, and with a touchpad 141 at a location where no physical key is provided. The communication apparatus 1 for example receives a selection operation on an object for operation using a physical key or receives a movement operation of a pointer or the like using the touchpad 141.

[Applications]

Applications are installed on the communication apparatus 1 and stored in the memory 12 so as to be executable by the controller 10. When the applications are installed on the communication apparatus 1, a unique user identifier (hereinafter, also abbreviated as UID) is allocated to each application. Each application is executed by the controller 10 as a process associated with a UID on the OS.

When executed by the controller 10, an application accesses resources such as the file system. If each application were to access resources without restriction, the resource areas used by the applications would overlap, which might prevent the applications from executing properly. Therefore, access to resources is restricted by the UIDs associated with processes running on the OS, so that applications do not affect each other with their use of resources. In other words, the resources that can be accessed by each process are restricted to resources of the process associated with the same UID.

Each application is further allocated a group identifier (hereinafter, also abbreviated as GID or group ID). The GID identifies the group to which the unique UID allocated to each application belongs. One UID alone may belong to one group, or a plurality of UIDs may belong to one group. When an application is executed as a process associated with a UID, the process is also associated with a GID. The restricted resources that can be accessed by each process may be broadened to include not only resources of the process associated with the same UID, but also resources of processes associated with the same GID.

Applications are executed in the foreground or the background. A state in which an application is executed in the foreground is, for example, a state in which the execution status is displayed on the display 13 to allow user confirmation, or a state in which the user can perform operations with the operation interface 14. A state in which an application is executed in the background is, for example, a state in which the execution status is not displayed on the display 13 and the user cannot perform operations, or a state in which the application is running without intent by the user.

[Control of Data Communication]

The applications executed by the controller 10 perform data communication with a network, such as the Internet, using the communication interface 11. As described above, the applications are each executed as a process associated with a UID on the OS. The UID is also associated with the data transmitted by the application. By determining whether to permit or prohibit (restrict) transmission of data based on the UID associated with the data, the controller 10 can control whether to permit or prohibit data communication for the data transmitted by each application. As a general rule, in the following explanation of this embodiment, data communication refers to data communication between the communication interface 11 and the network.

Figure 3:
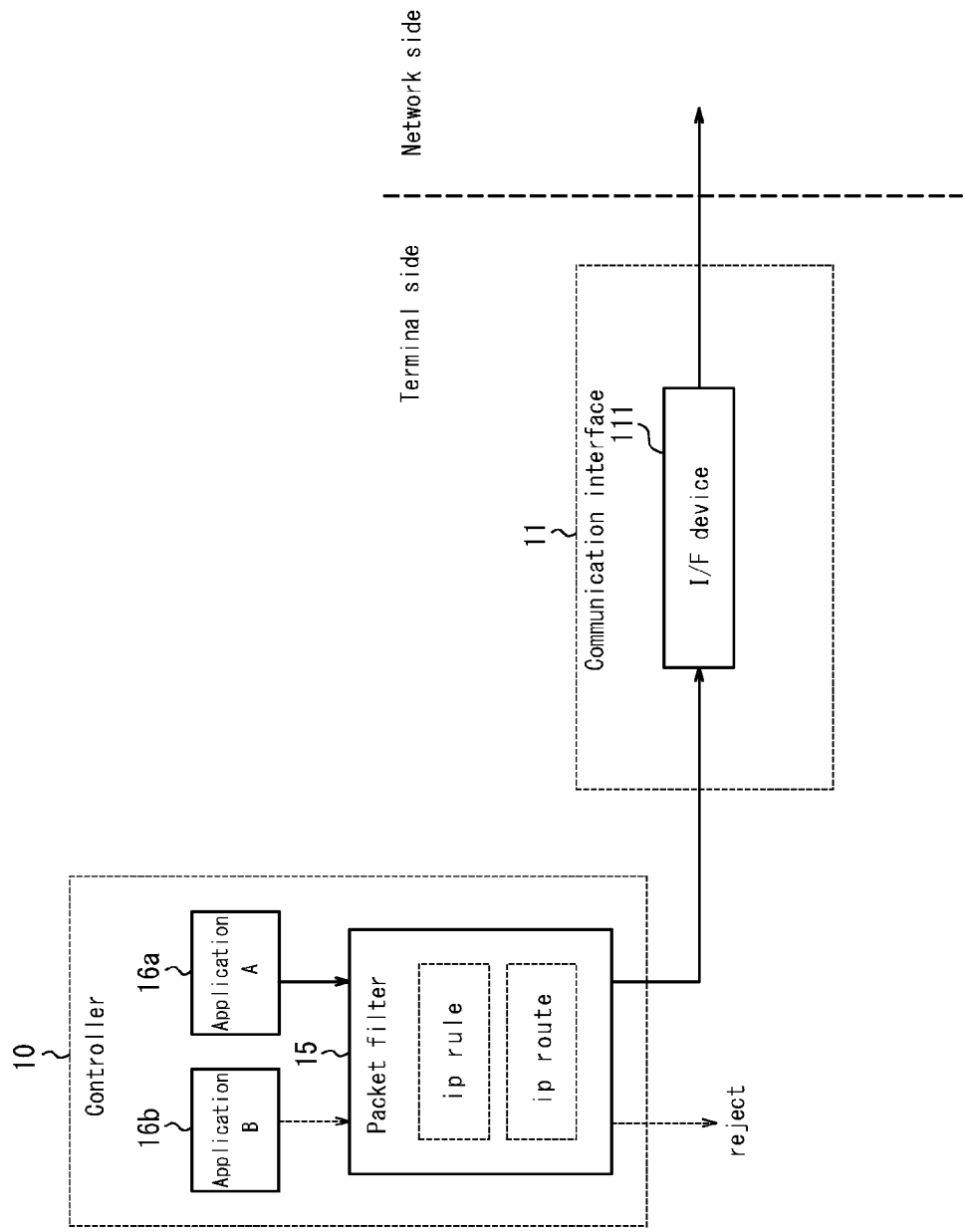
FIG. 3 is a block diagram illustrating an example of the flow of data according to Embodiment 1.

FIG. 3 is a block diagram illustrating an example of the flow of data according to this embodiment. In FIG. 3, the controller 10 and the communication interface 11 are provided on the terminal side. The communication interface 11 is connected to the network and performs data communication with the network.

In FIG. 3, the controller 10 executes an application A 16a and an application B 16b as processes on the OS. The applications executed by the controller 10 request data communication with the network as necessary. Requesting data communication is also referred to as issuing a request of data communication. For example, the application A 16a requests data transmission to the network. In this case, the data to transmit from the application A 16a to the network are input into a packet filter 15 operating in the controller 10. Similarly, data to transmit from the application B 16b to the network are input into the packet filter 15 from the application B 16b.

The packet filter 15 filters data from the controller 10 to the network. The filtering is processing to determine whether to permit or prohibit transmission of data requested by an application based on set filtering conditions. The filtering conditions for example include an ip_rule or an ip_route. These filtering conditions are stored in the memory 12 and referred to by the packet filter 15. Hereinafter, operations to set the filtering conditions are assumed to include operations to store the filtering conditions in the memory 12. The filtering conditions may be held in the controller 10 without being stored in the memory 12.

The ip_rule for example includes a condition for determining whether to transmit data whose source is X to the network. The ip_route for example includes a condition for determining the route (relay router or the like) for transmitting data for which the destination is designated as Y to the network.

In FIG. 3, the flow of data transmitted from the application A 16a is indicated by a solid arrow, whereas the flow of data transmitted from the application B 16b is indicated by a dashed arrow. Of these two, the data transmitted from the application A 16a are transmitted to the communication interface 11 without transmission being prohibited by the filtering in the packet filter 15. On the other hand, the data transmitted from the application B 16b are prohibited by the filtering in the packet filter 15 and are not transmitted to the communication interface 11. This operation is indicated by the dashed arrow in FIG. 3 pointing towards the word "reject".

The data that pass through the packet filter 15 (in the case of FIG. 3, the data transmitted from the application A 16a as indicated by the solid arrow) are input into the communication interface 11. The communication interface 11 transmits the data to the network using the I/F device 111. When transmitting the data to the network, the communication interface 11 may use cellular communication by the modem 112, wireless LAN communication by the wireless LAN device 113, or another communication method.

[Filtering]

It is determined whether to permit or prohibit data communication for data transmitted from an application based on the UID allocated to the application that is the source of data transmission. Hereinafter, data that are transmitted from an application to which X is allocated as the UID (hereinafter, also referred to as application with a UID of X) are also referred to as data with a UID of X. The filtering condition used to filter data with a UID of X is also referred to as the filtering condition for data with a UID of X.

The packet filter 15 for example has a filtering condition that only allows data communication for data transmitted from an application with a UID of 1. The filtering condition may also be a combination of a plurality of conditions.

The following describes the sequence for data communication when filtering according to this embodiment is performed. The filtering according to this embodiment is assumed to determine whether to permit or prohibit data communication for data transmitted by an application running in the background. The following description of filtering according to this embodiment is based on this assumption.

The filtering according to this embodiment has a set filtering condition such that data communication is prohibited by default (hereinafter, also referred to as default condition to prohibit communication). By the default condition to prohibit communication being set, all data communication is prohibited unless another filtering condition is further set. The default condition to prohibit communication may be set when the communication apparatus 1 is shipped or when the communication apparatus 1 is initialized. In other words, in this embodiment, the "default" refers to the standard operation that is set in advance at a predetermined time (for example, when the communication apparatus 1 is shipped, when the communication apparatus 1 is initialized, or the like).

In the filtering conditions used in this embodiment, in order to perform necessary data communication, a condition to permit data communication (hereinafter, also referred to as condition to permit communication) is set in addition to the default condition to prohibit communication. In this case, the condition to permit communication takes priority over the default condition to prohibit communication.

Figure 4:
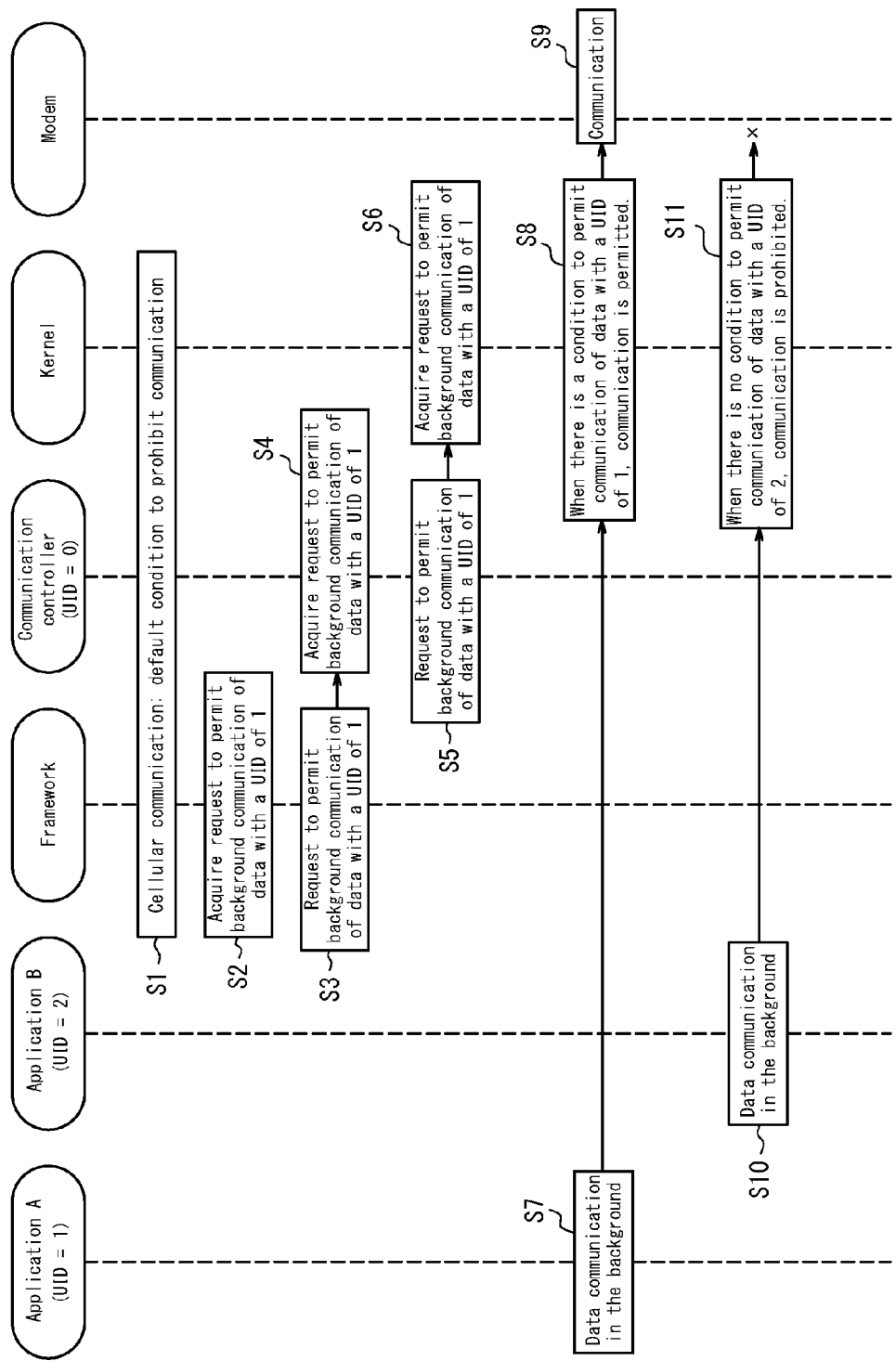
FIG. 4 illustrates the sequence of filtering according to Embodiment 1.

FIG. 4 illustrates the sequence of filtering according to this embodiment. FIG. 4 illustrates the sequence for the application A 16a, the application B 16b, a framework, a communication controller, a kernel, and the modem 112.

As described above, the modem 112 is hardware that functions as a communication interface to perform cellular communication. In FIG. 4, data communication by cellular communication using the modem 112 is described, but the modem 112 may be replaced by another I/F device 111, such as the wireless LAN device 113, and data communication may be performed by another communication method.

The kernel, communication controller, and framework are software executed by the controller 10. In FIG. 4, the communication controller is allocated a UID of 0.

The framework is software that includes a functional group for causing applications to operate on the OS. In general, by combining portions of the functional group prepared on the framework, the functions of each application can be implemented.

The kernel is software that forms the nucleus of the OS. Based on processing of the applications and other software, the kernel manages processing on the communication interface 11 and other hardware to allow use of the hardware functions.

The communication controller is a daemon program that executes network related processing and executes processing that connects the framework and the kernel. In particular, the communication controller processes data to allow the kernel to use the functions of the communication interface 11. In this embodiment, the communication controller outputs, to the kernel, conditions for the kernel to determine whether to permit or prohibit data output to the communication interface 11.

In this embodiment, the filtering is described as being performed by the packet filter 15. The packet filter 15 is a virtual processing unit, and the actual filtering is performed by the communication controller and the kernel.

The application A 16a and the application B 16b are processes running on the OS. In FIG. 4, a UID of 1 is allocated to the application A 16a, and a UID of 2 is allocated to the application B 16b.

The following describes the sequence illustrated in FIG. 4. In the case of data transmission by an application running in the background, data communication by cellular communication is prohibited by default (step S1). In other words, as a filtering condition, a default condition to prohibit communication is set for data transmitted from an application running in the background. In FIG. 4, the kernel, communication controller, and framework recognize that the default condition to prohibit communication is set. In particular, when the kernel recognizes that the default condition to prohibit communication is set, data are not transmitted to the modem 112.

Next, the framework acquires a request to permit data communication for data with a UID of 1 in the case of an application running in the background (hereinafter, also referred to as request to permit communication of data with a UID of 1) (step S2). The framework then outputs the request to permit communication of data with a UID of 1 to the communication controller (step S3).

The communication controller acquires the request to permit communication of data with a UID of 1 (step S4). Next, the communication controller outputs the request to permit communication of data with a UID of 1 to the kernel (step S5).

The kernel acquires the request to permit communication of data with a UID of 1 (step S6). With the above operations in steps S3 to S6, the request to permit communication of data with a UID of 1 is conveyed to the kernel. In other words, as a filtering condition, a condition to permit communication for data with a UID of 1 is set.

Next, when the application A 16a issues a request for data communication while running in the background (step S7), the kernel permits the data communication, since the kernel recognizes that the condition to permit communication for data with a UID of 1 is set (step S8). The modem 112 then performs data communication to transmit the data with a UID of 1 to the network (step S9).

Conversely, when the application B 16b allocated a UID of 2 requests data communication while running in the background (step S10), the kernel recognizes that a condition to permit communication for data with a UID of 2 is not set. Therefore, the kernel prohibits data communication based on the default condition to prohibit communication (step S11).

<Sequence of Data Transmission from an Application>

Figure 5:
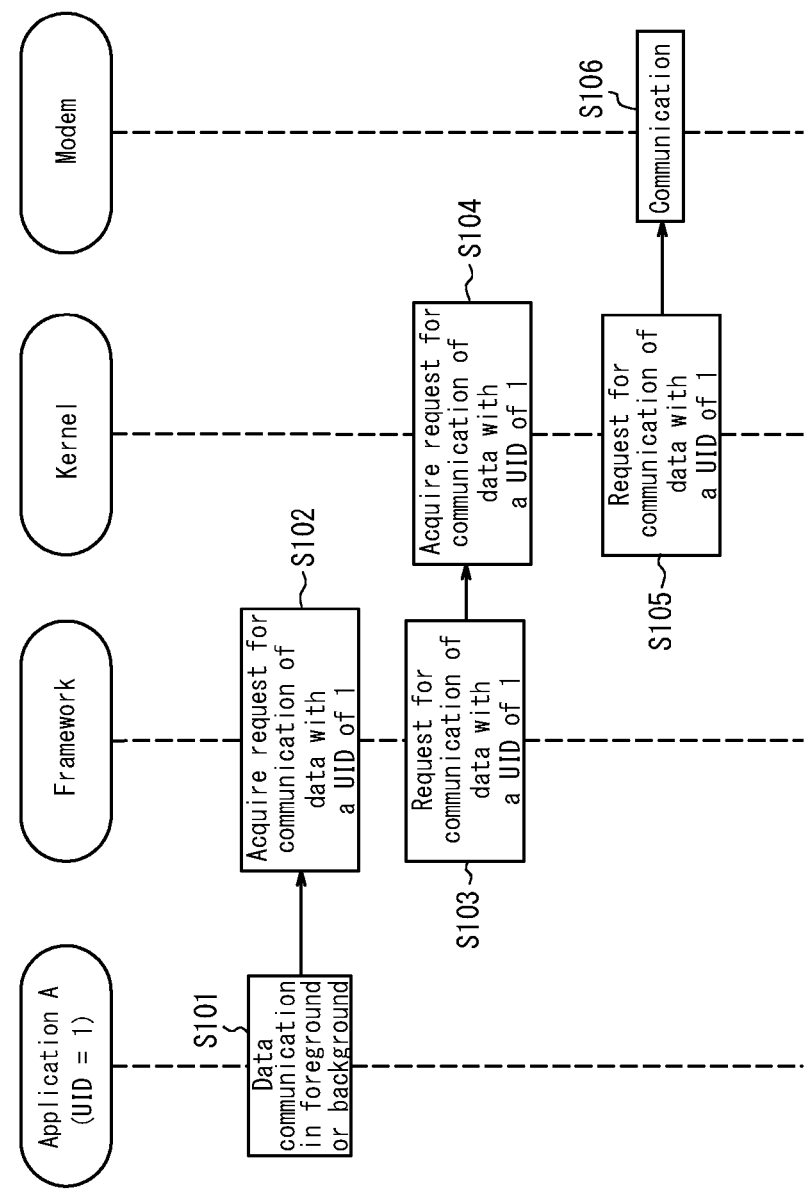
FIG. 5 illustrates an example of a sequence for transmitting data from an application.

In steps S7 to S9 of FIG. 4, the case of an application requesting data communication and the modem 112 performing data communication has been described. With reference to FIG. 5, the following describes this sequence in greater detail. FIG. 5 illustrates the sequence for the application A 16a, framework, kernel, and modem 112. A description of the application A 16a, framework, kernel, and modem 112 is the same as in FIG. 4 and is therefore omitted.

Whether running in the foreground or the background, the application A 16a outputs a request, to the framework on the OS on which the application A 16a is running, for data communication of data (data with a UID of 1) transmitted from the application A 16a (hereinafter, also referred to as request for communication of data with a UID of 1) (step S101).

The framework acquires the request for communication of data with a UID of 1 (step S102). Next, the framework outputs the request for communication of data with a UID of 1 to the kernel (step S103).

The kernel acquires the request for communication of data with a UID of 1 (step S104). Next, the kernel outputs data based on the request for communication of data with a UID of 1 to the modem 112 (step S105). The modem 112 then performs data communication to transmit the data with a UID of 1 to the network (step S106).

With the operations of the sequence illustrated in FIG. 5 as described above, data transmitted from the application are output to the communication interface 11 and are transmitted to the network.

Embodiment 1 has been described. With the filtering in accordance with the UID as in this embodiment, data communication for data transmitted from the application B 16b, for which a filtering condition has not been explicitly set by the user, can be prohibited. In other words, the probability of prohibiting data communication that is not intended by the user increases.

In this embodiment, a method for prohibiting data communication via a cellular communication method using the modem 112 as the I/F device 111 has mainly been described. The I/F device 111 is not limited to the modem 112, however, and may be the wireless LAN device 113 or the like. In other words, the control method for data communication of the communication apparatus 1 according to this embodiment is not limited to data communication with a cellular communication method and may also be applied to data communication with another communication method, such as a wireless LAN communication method.

In this embodiment, data communication may be permitted by default for functions that are necessary to transmit the data for which data communication is permitted. The functions for which data communication is permitted by default may, for example, be a tunneling function of a Virtual Private Network (VPN), a name resolving function of a Domain Name System (DNS), or a tethering function. Permission for data communication related to these functions may be restricted to operations intended by the user. The condition for permitting data communication for these functions may be set as a filtering condition that takes priority over the default condition to prohibit communication.

The filtering according to this embodiment is performed for data communication of an application running in the background, but filtering is not limited to this case and may be performed for data communication of an application running in the foreground. In other words, the filtering according to this embodiment may determine whether to permit or prohibit data communication for data transmitted by an application running in the foreground.

Embodiment 2

In Embodiment 1, filtering was performed in accordance with the UID, but filtering may be performed in accordance with the GID instead. As Embodiment 2, the following describes filtering in accordance with the GID.

Figure 6:
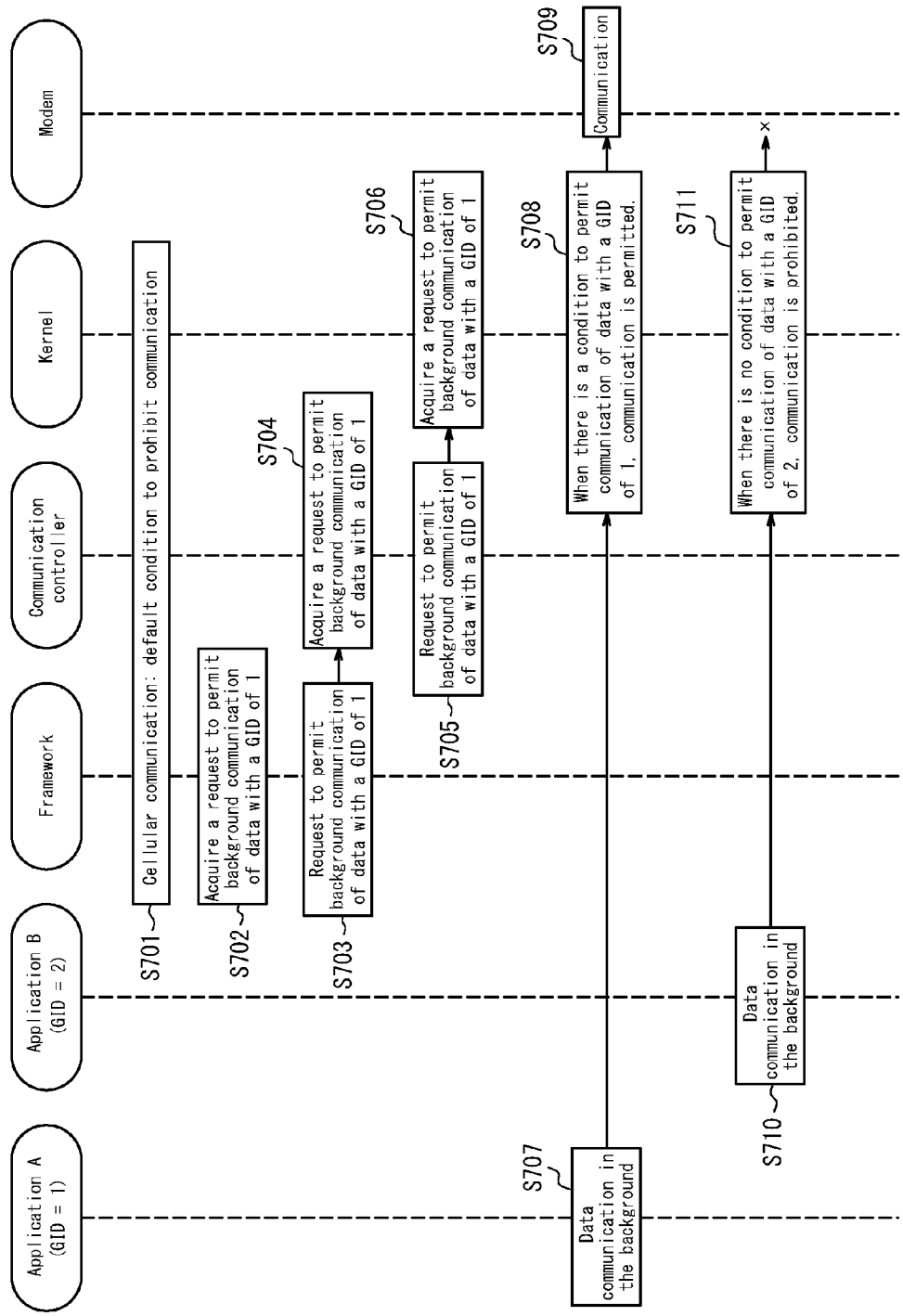
FIG. 6 illustrates the sequence of filtering according to Embodiment 2.

FIG. 6 illustrates the sequence of filtering according to this embodiment. FIG. 6 illustrates the sequence for the application A 16a, application B 16b, framework, communication controller, kernel, and modem 112. A description of the framework, communication controller, kernel, and modem 112 is the same as in FIG. 4 of Embodiment 1 and is therefore omitted.

In FIG. 6, the application A 16a is an application with a GID of 1, and the application B 16b is an application with a GID of 2.

The following describes the sequence illustrated in FIG. 6. In the case of data transmission by an application running in the background, data communication by cellular communication is prohibited by default (step S701). In other words, as a filtering condition, a default condition to prohibit communication is set for data transmitted from an application running in the background. In FIG. 6, the kernel, communication controller, and framework recognize that the default condition to prohibit communication is set. In particular, when the kernel recognizes that the default condition to prohibit communication is set, data are not transmitted to the modem 112.

Next, the framework acquires a request to permit data communication for data with a GID of 1 in the case of an application running in the background (hereinafter, also referred to as request to permit communication of data with a GID of 1) (step S702). The framework then outputs the request to permit communication of data with a GID of 1 to the communication controller (step S703).

The communication controller acquires the request to permit communication of data with a GID of 1 (step S704). Next, the communication controller outputs the request to permit communication of data with a GID of 1 to the kernel (step S705).

The kernel acquires the request to permit communication of data with a GID of 1 (step S706). With the above operations in steps S703 to S706, the request to permit communication of data with a GID of 1 is conveyed to the kernel. In other words, as a filtering condition, a condition to permit communication for data with a GID of 1 is set.

Next, when the application A 16a issues a request for data communication while running in the background (step S707), the kernel permits the data communication, since the kernel recognizes that the condition to permit communication for data with a GID of 1 is set (step S708). The modem 112 then performs data communication to transmit the data with a GID of 1 to the network (step S709).

Conversely, when the application B 16b with a GID of 2 requests data communication while running in the background (step S710), the kernel recognizes that a condition to permit communication for data with a GID of 2 is not set. Therefore, the kernel prohibits data communication based on the default condition to prohibit communication (step S711).

In steps S707 to S709 of FIG. 6, an application requests data communication, and the modem 112 then performs data communication. Since this data communication is performed with a similar sequence as that of FIG. 5 in Embodiment 1, a description thereof is omitted.

As described above, by setting a filtering condition in accordance with the GID, filtering that is similar to the filtering in accordance with the UID in Embodiment 1 can be implemented.

[Filtering in a VPN]

As an example of filtering in accordance with the GID, the following describes filtering in the case of encapsulating data for data communication using a tunneling function of a VPN. In this embodiment, the communication apparatus 1 is further provided with a VPN device. The VPN device has a protocol to encapsulate acquired data. The protocol that the VPN device has is allocated a unique UID. The UID allocated to the protocol is also referred to as the UID of the protocol. The VPN device encapsulates data from an application based on this protocol. The VPN device then outputs the encapsulated data to the communication interface 11. The encapsulated data lose the association with the UID allocated to the application transmitting the data. The UID of the protocol that encapsulated the data is then newly associated with the encapsulated data.

The VPN device may have a plurality of protocols to encapsulate data. In this case, the UIDs of these protocols differ. The UID of the protocol that encapsulates data is associated with the encapsulated data. When the VPN device has a plurality of protocols to encapsulate data, the UIDs of these protocols belong to a common group. A GID is allocated to this common group. Accordingly, a common GID is associated with the plurality of protocols that the VPN device has. Hereinafter, the GID associated in common with the plurality of protocols that the VPN device has is also referred to as the GID of the VPN device. The GID of the VPN device that has the protocol that encapsulated the data is newly associated with the encapsulated data. The protocol that the VPN device has may be included in an application. In this case, the protocol that the VPN device has is also referred to as a VPN application.

The UID of the protocol that encapsulates data in the VPN device is associated with the encapsulated data. As described above, the VPN device has a plurality of protocols. Accordingly, there is a plurality of UIDs that might be associated with data encapsulated in the VPN device. When filtering encapsulated data, if filtering conditions in accordance with the UID are set, the same number of filtering conditions as the number of protocols is set.

On the other hand, a GID is also associated with encapsulated data. Accordingly, a common GID is associated with the UIDs of the plurality of protocols that the VPN device has. Hence, when setting a filtering condition in accordance with the GID, it suffices to set one common filtering condition for the protocols.

Embodiment 2 has been described. According to this embodiment, permission or prohibition of data communication by an application can easily be set.

In this embodiment as well, the I/F device 111 is not limited to the modem 112 and may be the wireless LAN device 113 or the like. In other words, the control method for data communication of the communication apparatus 1 according to this embodiment is not limited to data communication with a cellular communication method and may also be applied to data communication with another communication method, such as a wireless LAN communication method.

Embodiment 3

As Embodiment 3, the case of further filtering in accordance with the GID after filtering in accordance with the UID is described. In this embodiment, the default condition to prohibit communication is assumed to be set as a filtering condition.

Figure 7:
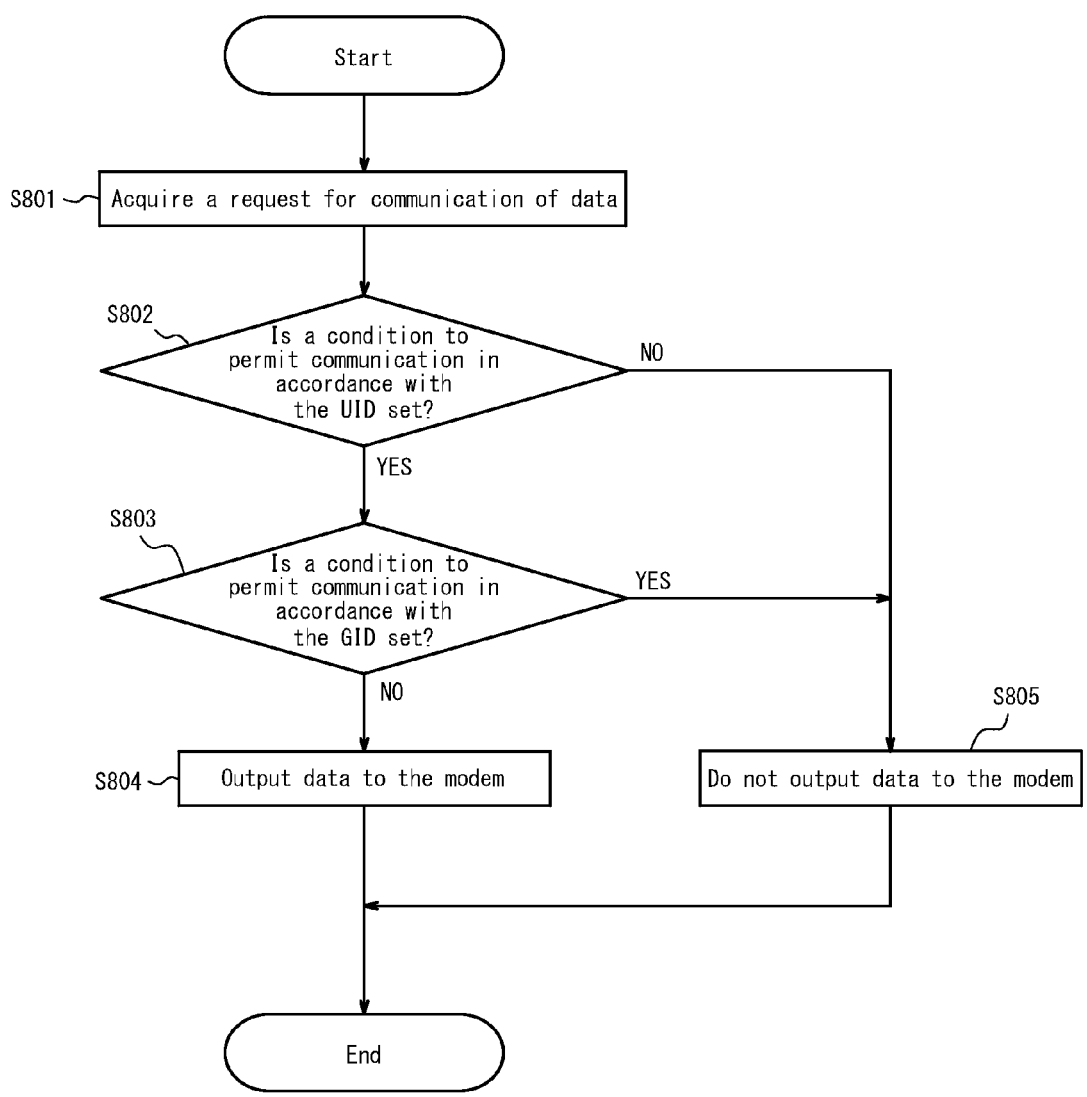
FIG. 7 is a flowchart of filtering according to Embodiment 3.

FIG. 7 is a flowchart of filtering according to this embodiment. First, the packet filter 15 acquires a data communication request for data with a UID of X and a GID of Y from an application (step S801). Next, the packet filter 15 determines whether a condition to permit communication for data with a UID of X (hereinafter, also referred to as condition to permit communication in accordance with the UID) is set as a filtering condition (step S802).

When the condition to permit communication in accordance with the UID is not set (step S802: NO), the packet filter 15 does not output data to the modem 112 (step S805) and then ends the flowchart in FIG. 7.

When the condition to permit communication in accordance with the UID is set (step S802: YES), the packet filter 15 determines whether a condition to prohibit data communication for data with a GID of Y (hereinafter, also referred to as condition to prohibit communication in accordance with the GID) is set as a filtering condition (step S803).

When the condition to prohibit communication in accordance with the GID is set (step S803: YES), the packet filter 15 does not output data to the modem 112 (step S805) and then ends the flowchart in FIG. 7.

When the condition to prohibit communication in accordance with the GID is not set (step S803: NO), the packet filter 15 outputs data to the modem 112 (step S804) and then ends the flowchart in FIG. 7.

Embodiment 3 has been described with reference to the flowchart in FIG. 7. In this embodiment, performing filtering in accordance with the UID and the GID allows greater variation in the methods of setting permission and prohibition of data communication by an application.

In this embodiment as well, the I/F device 111 is not limited to the modem 112 and may be the wireless LAN device 113 or the like. In other words, the control method for data communication of the communication apparatus 1 according to this embodiment is not limited to data communication with a cellular communication method and may also be applied to data communication with another communication method, such as a wireless LAN communication method.

Embodiment 4

As Embodiment 4, a method for counting the amount of data communication when performing filtering in accordance with the UID and the GID is described. In this embodiment, the count of the amount of data communication is performed in the packet filter 15. In this embodiment, the default condition to prohibit communication is assumed to be set as a filtering condition.

Figure 8:
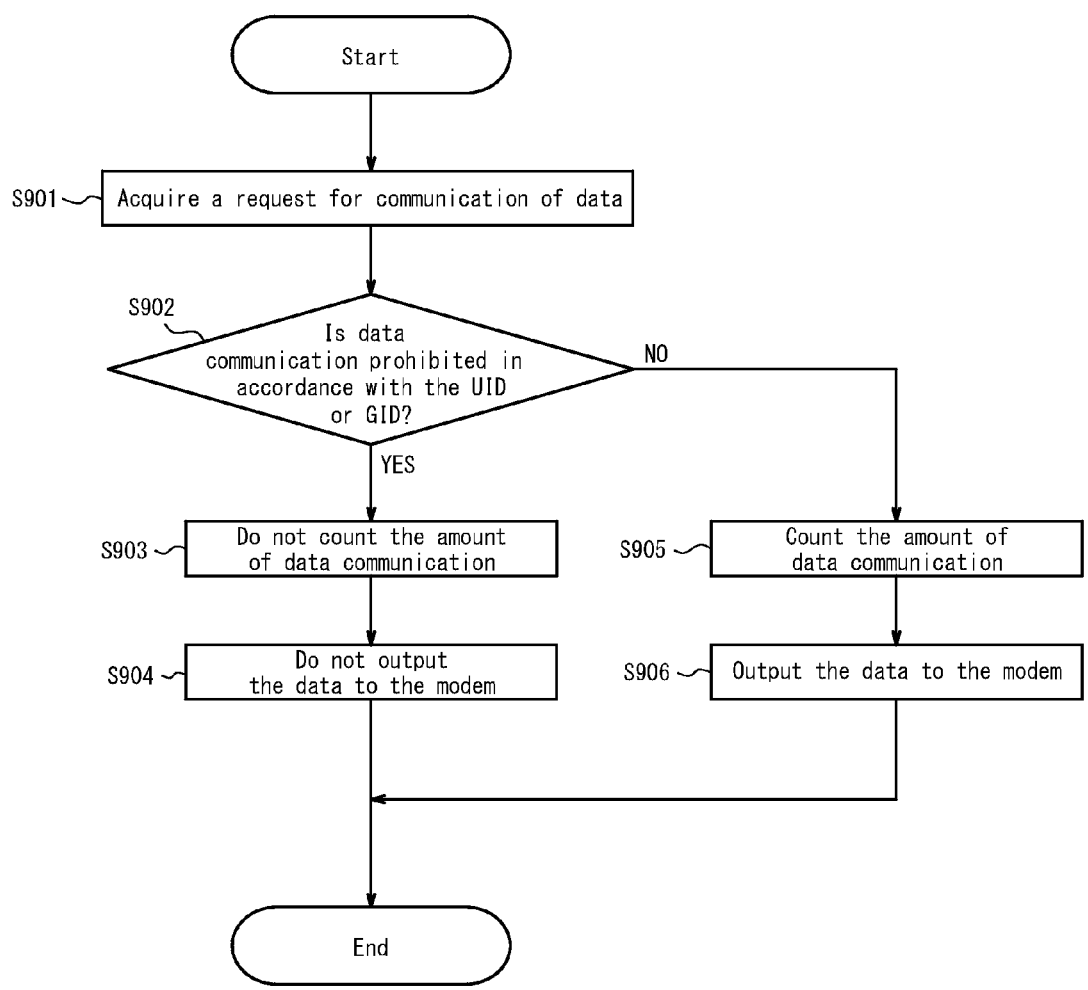
FIG. 8 is a flowchart of data amount counting according to Embodiment 4.

FIG. 8 is a flowchart of data amount counting according to this embodiment. First, the packet filter 15 acquires a data communication request for data with a UID of X and a GID of Y from an application (step S901).

Next, the packet filter 15 determines whether to prohibit data communication for data with a UID of X and a GID of Y (step S902). Step S902 is to determine whether to prohibit data communication in accordance with the UID or GID and is performed with processing similar to that of step S802 or S803 in FIG. 7 of Embodiment 3. That is, when a condition to permit communication in accordance with the UID is set (step S802: YES), and a condition to prohibit communication in accordance with the GID is not set (step S803: NO), the packet filter 15 does not prohibit (i.e. permits) the data communication. On the other hand, when a condition to permit communication in accordance with the UID is not set (step S802: NO), or a condition to prohibit communication in accordance with the GID is set (step S803: YES), the packet filter 15 prohibits the data communication.

When it is determined that data communication is prohibited (step S902: YES), the packet filter 15 does not count the amount of data communication with respect to the data for which data communication was requested (step S903). Next, the packet filter 15 does not output the data to the modem 112 (step S904) and then ends the flowchart in FIG. 8.

When it is determined that data communication is not prohibited (step S902: NO), the packet filter 15 counts the amount of data communication with respect to the data for which data communication was requested (step S903). Next, the packet filter 15 outputs the data to the modem 112 (step S904) and then ends the flowchart in FIG. 8.

With the approach that has been described with reference to FIG. 8, the difference between the amount of data communication counted by the packet filter 15 and the amount of data output by the packet filter 15 to the modem 112 can be reduced.

Comparative Example

Figure 9:
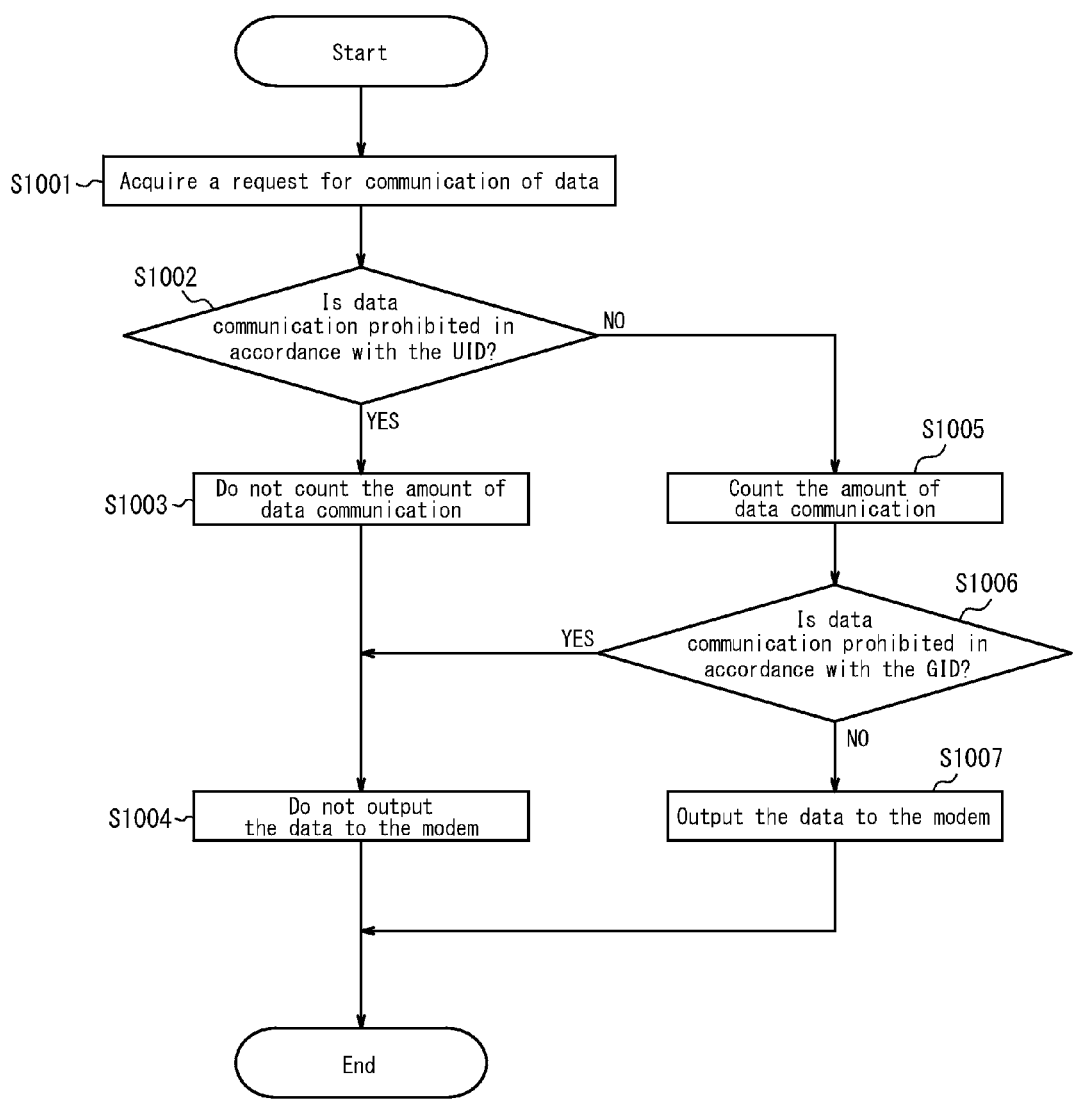
FIG. 9 is a flowchart of data amount counting according to a Comparative Example.

FIG. 9 is a flowchart of data amount counting according to a Comparative Example. First, the packet filter 15 acquires a data communication request for data with a UID of X and a GID of Y from an application (step S1001).

Next, the packet filter 15 determines whether to prohibit data communication for data with a UID of X (step S1002). Step S1002 is to determine whether to prohibit data communication in accordance with the UID and is performed with processing similar to that of step S802 in FIG. 7 of Embodiment 3. That is, when a condition to permit communication in accordance with the UID is set (step S802: YES), the packet filter 15 does not prohibit (i.e. permits) the data communication. On the other hand, when a condition to permit communication in accordance with the UID is not set (step S802: NO), the packet filter 15 prohibits the data communication.

When it is determined that data communication is prohibited in accordance with the UID (step S1002: YES), the packet filter 15 does not count the amount of data communication with respect to the data for which data communication was requested (step S1003). Next, the packet filter 15 does not output the data to the modem 112 (step S1004) and then ends the flowchart in FIG. 9.

When it is determined that data communication is not prohibited in accordance with the UID (step S902: NO), the packet filter 15 counts the amount of data communication with respect to the data for which data communication was requested (step S1005).

Next, the packet filter 15 determines whether to prohibit data communication for data with a GID of Y (step S1006). Step S1006 is to determine whether to prohibit data communication in accordance with the GID and is performed with processing similar to that of step S803 in FIG. 7 of Embodiment 3. That is, when a condition to prohibit communication in accordance with the GID is set (step S803: YES), the packet filter 15 prohibits the data communication.

On the other hand, when a condition to prohibit communication in accordance with the GID is not set (step S803: NO), the packet filter 15 does not prohibit (i.e. permits) the data communication.

When it is determined that data communication is not prohibited in accordance with the GID (step S1006: NO), the packet filter 15 outputs the data to the modem 112 (step S1007) and then ends the flowchart in FIG. 8. In this case, after the amount of data communication with respect to the data for which data communication was requested is counted in step S1005, the data are output to the modem 112. Accordingly, the amount of data communication counted by the packet filter 15 and the amount of data output by the packet filter 15 to the modem 112 match.

When it is determined that data communication is prohibited in accordance with the GID (step S1006: YES), the packet filter 15 does not output the data to the modem 112 (step S1004) and ends the flowchart in FIG. 9. In this case, after the amount of data communication with respect to the data for which data communication was requested is counted in step S1005, the data are not output to the modem 112. Accordingly, the amount of data communication counted by the packet filter 15 and the amount of data output by the packet filter 15 to the modem 112 do not match.

A Comparative Example has been described with reference to FIG. 9. In the Comparative Example, the amount of data communication counted by the packet filter 15 and the amount of data output by the packet filter 15 to the modem 112 might not match.

Embodiment 4 has been described above. According to this embodiment, in contrast with the Comparative Example, the difference between the amount of data communication counted by the packet filter 15 and the amount of data output by the packet filter 15 to the modem 112 can be reduced.

In this embodiment as well, the I/F device 111 is not limited to the modem 112 and may be the wireless LAN device 113 or the like. In other words, the control method for data communication of the communication apparatus 1 according to this embodiment is not limited to data communication with a cellular communication method and may also be applied to data communication with another communication method, such as a wireless LAN communication method.

A communication apparatus, communication control method, and non-transitory computer-readable recording medium according to embodiments of this disclosure can reduce the difference between the counted amount of communication data and the amount of data actually transmitted to the network.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure. For example, the functions and the like included in the various components and steps may be reordered in any logically consistent way. Furthermore, components or steps may be combined into one or divided. While this disclosure has been described focusing on apparatuses, this disclosure may also be embodied as a method that includes steps performed by the components of an apparatus. Furthermore, while this disclosure has been described focusing on apparatuses, this disclosure may also be embodied as a method or program executed by a processor provided in an apparatus, or as a non-transitory computer-readable recording medium on which a program is recorded. Such embodiments are also to be understood as included in the scope of this disclosure.

In the above embodiments, wireless LAN has been provided as an example of a data communication method that is not a pay-as-you-go method, but this example is not limiting. Other data communication methods that are not pay-as-you-go methods include Bluetooth® and Ethernet® (Bluetooth and Ethernet are registered trademarks in Japan, other countries, or both).

The invention claimed is:

1. A communication apparatus comprising:
a controller configured to
prohibit data communication by default;
receive a request for data communication from an application;
permit data communication of the application in accordance with a unique user identifier (UID) of the application issuing the request; and
prohibit data communication of the application depending on an identifier (ID) of a group to which the application issuing the request belongs.

2. A communication control method comprising:
on a communication apparatus,
prohibiting data communication by default;
receiving a request for data communication from an application; and
permitting data communication of the application in accordance with a unique user identifier (UID) of the application issuing the request, and prohibiting data communication of the application depending on an identifier (ID) of a group to which the application issuing the request belongs.

3. A non-transitory computer-readable recording medium including computer program instructions, which when executed by a computer functioning as a communication apparatus, cause the computer to:
prohibit data communication by default;
receive a request for data communication from an application; and
permit data communication of the application in accordance with a unique user identifier (UID) of the application issuing the request, and prohibit data communication of the application depending on an identifier (ID) of a group to which the application issuing the request belongs.

4. A communication apparatus comprising:
a controller configured to
prohibit data communication by default;
receive a request for data communication from an application;
count an amount of data communication of the application in accordance with a unique user identifier (UID) of the application issuing the request; and
not count an amount of data communication of the application depending on an identifier (ID) of a group to which the application issuing the request belongs.

5. A communication control method comprising:
on a communication apparatus,
prohibiting data communication by default;
receiving a request for data communication from an application; and
counting an amount of data communication of the application in accordance with a unique user identifier (UID) of the application issuing the request, and not counting an amount of data communication of the application depending on an identifier (ID) of a group to which the application issuing the request belongs.

6. A non-transitory computer-readable recording medium including computer program instructions, which when executed by a computer functioning as a communication apparatus, cause the computer to:

prohibit data communication by default;

receive a request for data communication from an application; and count an amount of data communication of the application in accordance with a unique user identifier (UID) of the application issuing the request, and not count an amount of data communication of the application depending on an identifier (ID) of a group to which the application issuing the request belongs.

* * * * *